(12) United States Patent
Xie

(10) Patent No.: US 10,149,581 B2
(45) Date of Patent: Dec. 11, 2018

(54) COMPOUND TYPE POLYURETHANE TOILET SEAT AND PREPARATION PROCESS THEROF

(71) Applicant: Fangkui Xie, Miao Antonymous Region Yunnan (CN)

(72) Inventor: Fangkui Xie, Miao Antonymous Region Yunnan (CN)

(73) Assignee: Finehope Polyurethane Products Co., Ltd. (CN)

( * ) Notice: Subject to any disclaimer, the term of this patent is extended or adjusted under 35 U.S.C. 154(b) by 18 days.

(21) Appl. No.: 15/503,988

(22) PCT Filed: Jun. 12, 2015

(86) PCT No.: PCT/CN2015/081370
§ 371 (c)(1),
(2) Date: Feb. 14, 2017

(87) PCT Pub. No.: WO2016/112623
PCT Pub. Date: Jul. 21, 2016

(65) Prior Publication Data
US 2017/0273517 A1    Sep. 28, 2017

(30) Foreign Application Priority Data

Jan. 14, 2015    (CN) .......................... 2015 1 0017386
Jun. 12, 2015    (WO) ................ PCT/CN2015/081370

(51) Int. Cl.
*A47K 13/02*    (2006.01)
*B29C 45/14*    (2006.01)
(Continued)

(52) U.S. Cl.
CPC ........ *A47K 13/02* (2013.01); *B29C 45/14311* (2013.01); *B29C 45/14336* (2013.01);
(Continued)

(58) Field of Classification Search
CPC .............. A47K 13/02; B29C 45/14311; B29C 45/14336; B29C 2045/14877; B29K 2075/00; B29L 2031/7694
(Continued)

(56) References Cited

U.S. PATENT DOCUMENTS 1,396,934 A * 11/1921 Judd ...................... A47K 13/02
                                                        264/273
1,766,659 A *  6/1930 Leslie .................... A47K 13/00
                                                        264/259
(Continued)

FOREIGN PATENT DOCUMENTS

CN        1561895 A       1/2005
CN      201029834 Y       3/2008
(Continued)

Primary Examiner — Benjamin R Shaw (57) ABSTRACT

A compound type polyurethane toilet seat, comprising a surface coating layer, a positioning structure and a seat support; the surface coating layer is made from polyurethane and seamlessly covers the outer surface of the seat support by means of the positioning structure; the preparation process comprises: step 1, spraying a release agent and an in-mold paint in a cavity of a mold; step 2, cleaning the surface of the seat support; step 3, polishing or abrasive blasting; step 4, thermally treating the seat support; step 5, spraying the release agent in the cavity of the mold, and installing the seat support in the cavity of the mold; step 6, injecting a polyurethane raw material into the cavity of the mold, and shaking the mold; step 7, foaming the polyurethane raw material.

17 Claims, 4 Drawing Sheets

Before Injecting    Start Injecting    Start Foaming    Foaming Completed (51) Int. Cl.
  *B29K 75/00* (2006.01)
  *B29L 31/00* (2006.01)
  *B29K 711/14* (2006.01)
  *B29K 627/06* (2006.01)
  *B29C 44/08* (2006.01)
  *B29C 44/12* (2006.01)
  *B29K 705/00* (2006.01)
  *B29K 655/02* (2006.01)

(52) U.S. Cl.
  CPC ........ *B29C 44/08* (2013.01); *B29C 44/1271* (2013.01); *B29C 2045/14877* (2013.01); *B29K 2075/00* (2013.01); *B29K 2623/12* (2013.01); *B29K 2627/06* (2013.01); *B29K 2655/02* (2013.01); *B29K 2705/00* (2013.01); *B29K 2711/14* (2013.01); *B29K 2995/0063* (2013.01); *B29L 2031/7694* (2013.01)

(58) Field of Classification Search
  USPC .......................................................... 4/237
  See application file for complete search history.

(56) References Cited

U.S. PATENT DOCUMENTS

| | | | | |
|---|---|---|---|---|
| 2,985,171 | A * | 5/1961 | Wiederman | A47K 13/24 4/237 |
| 3,392,411 | A * | 7/1968 | Hansen | A47K 13/005 297/35 |
| 3,513,050 | A * | 5/1970 | Samuels | A47K 13/02 156/196 |
| 3,623,931 | A * | 11/1971 | Van Hosen | A47K 13/02 156/242 |
| 3,639,922 | A * | 2/1972 | Samuels | A47K 13/02 4/237 |
| 3,863,277 | A * | 2/1975 | Harrison | A47K 13/02 4/234 |
| 6,154,892 | A * | 12/2000 | Hogue | A47K 13/02 4/234 |
| 2003/0024036 | A1 * | 2/2003 | Toldo | A47K 13/00 4/237 |
| 2007/0094777 | A1 * | 5/2007 | Bryant | A47K 13/02 4/237 |
| 2009/0126090 | A1 * | 5/2009 | Chen | A47K 13/02 4/237 |
| 2017/0100005 | A1 * | 4/2017 | Bryant | A47K 13/02 |

FOREIGN PATENT DOCUMENTS

| | | |
|---|---|---|
| CN | 101961219 A | 2/2011 |
| CN | 104545656 A | 4/2015 |
| CN | 204394403 U | 6/2015 |

* cited by examiner

Figure 4

COMPOUND TYPE POLYURETHANE TOILET SEAT AND PREPARATION PROCESS THEROF

TECHNICAL FIELD OF THE INVENTION

The present invention relates to the technical field of sanitary wares, and more particularly, to a compound type polyurethane toilet seat and a process for preparing the same.

BACKGROUND OF THE INVENTION

The toilet is one of the indispensable sanitary wares in modern life. The traditional toilet comprises a toilet cover, a toilet seat, and a base. The toilet seat, which is in direct contact with the human skin, is usually made by means of plastic injection molding. The traditional toilet seat has the following shortcomings: first, the toilet seat can be very cold and uncomfortable to the user; second, the material of the toilet seat is too hard, leading to a low comfort level; third, the toilet seat and the base collide with each other, causing noise when the toilet seat is put down; fourth, the plastic material is prone yellowing with age, resulting in an ugly appearance and poor performance. Consequently, some toilet seats use polyurethane material instead of plastic material, aiming to overcome the above shortcomings.

In the prior art, the polyurethane toilet seat comprises two types: the embedded type polyurethane toilet seat and the compound type polyurethane toilet seat. An embedded type polyurethane foaming flush toilet disclosed in the patent 201120402590.2 uses the seat support as the embedded part. The seat support and the polyurethane foaming seat are molded in one body, and the seat support is covered in the polyurethane foaming seat. Such a design has two shortcomings: first, the polyurethane foaming seat and the seat support can be easily separated after prolonged use due to the poor bonding intensity, resulting in a short functional life of the product; second, the processing cost can be sharply increased due to such complicated process. Furthermore, the patent 201120402699.6 also discloses a compound type polyurethane toilet seat, wherein the polyurethane foaming seat and the seat support are respectively processed. After being processed, the polyurethane foaming seat and the seat support are bonded together. However, the compound type polyurethane toilet seat adopts the two-time molding process, meaning that the polyurethane material can merely be bonded to the seat support after foam forming. In such a way, the process becomes very complicated, undoubtedly increasing the manufacturing cost. Even worse, where the polyurethane foaming seat and the seat support are bonded can be easily delaminated and cracked, especially when the toilet seat is frequently put up and down or used in the cold weather. In such a condition, the bonding intensity between the polyurethane foaming seat and the seat support can be severely affected. Consequently, the polyurethane foaming seat can be easily separated from the seat support, resulting in a poor quality of the product.

In conclusion, the shortcomings of traditional toilet seat are urgent problems that need to be solved for those skilled in this field.

SUMMARY OF THE INVENTION

One purpose of the present invention is to provide a compound type polyurethane toilet seat, which can save the using cost, improve the bonding intensity, enhance the using quality and the comfort level, and satisfy the ergonomic requirements.

The other purpose of the present invention is to provide a preparation process of the compound type polyurethane toilet seat, which can optimize the manufacturing process, and realize the one-time molding of the compound type polyurethane toilet seat.

To achieve the above purposes, the present invention adopts the following technical solution:

A compound type polyurethane toilet seat comprising a surface coating layer, a positioning structure and a seat support. The surface coating layer, which is made from polyurethane, seamlessly covers the outer surface of the seat support through the positioning structure.

The positioning structure comprises a first turning portion and a first beam, which are integrally disposed at the end portion of the surface coating layer. The first turning portion is connected to the first beam, and the first beam extends upward to form a first hook-shaped structure. A second beam is integrally disposed on the upper side of the end portion of the toilet seat, and the second beam extends downward to form a second hook-shaped structure. The first hook-shaped structure is engaged with the second hook-shaped structure.

A preparation process of the compound type polyurethane toilet seat, comprising:

Step 1: spraying a release agent and an in-mold paint in a cavity of a mold;

Step 2: cleaning the surface of the seat support by industrial alcohol;

Step 3: polishing or abrasive blasting the seat support; afterwards, blowing the dust off the surface of the seat support;

Step 4: thermally treating the seat support under the temperature within a temperature of 50-120° C.; the thermal treatment time is 30-120 minutes;

Step 5: spraying the release agent in the cavity of the mold, and installing the seat support in the cavity of the mold; the temperature of the mold is controlled within the range of 20-60° C.;

Step 6: injecting a polyurethane raw material into the cavity of the mold, and shaking the mold;

Step 7: foaming the polyurethane raw material in the cavity of the mold, and making the polyurethane to seamlessly cover the outer surface of the seat support;

Step 8: opening the mold to take out the product after the polyurethane is cured in the mold, thereby completing the whole preparation process of the product; the curing time is less than 25 minutes.

In step 4, the cleaned seat support is thermally treated at a temperature of 60° C.

In step 5, the temperature of the mold is controlled at 50° C.

In step 8, the curing time of the polyurethane is 6 minutes.

The polyurethane raw material comprises a component A (polyether polyol and accessory material) and a component B (isocyanate), wherein the mass ratio of the component B to the component A is 0.2-0.6. The component A reacts with the component B under the temperate of 20-40° C.

The component A comprises the following raw materials in parts by weight: 100 parts of polyether polyol, 2 to 10 parts of chain extender, 0.3 to 3 parts of catalyst, 0.5 to 3 parts of surfactant, and 2 to 30 parts of foaming agent.

The isocyanate is a single-component isocyanate or multi-component isocyanate.

Compared with the prior art, the present invention has the following advantages:

First, compared with the traditional embedded type polyurethane toilet seat, the outer surface of the seat support is seamlessly covered by the surface coating layer of the present invention, which can provide the user a higher comfort level as well as decrease the use of polyurethane raw material. Consequently, the manufacturing cost can be effectively reduced and the marketing value of the product can be greatly improved.

Second, compared with the traditional compound type polyurethane toilet seat, the present invention adopts the one-time molding process, effectively simplifying the complicated steps so as to achieve a simpler and quick manufacturing process.

Third, the one-time molding process of the present invention enables the surface coating layer to seamlessly cover the seat support through the positioning structure, effectively eliminating the delamination phenomenon of the surface coating layer and the seat support. Furthermore, the present invention prevents the surface coating layer from being separated from the seat support due to the frequent use in the cold or hot weather, greatly improving the bonding intensity between the surface coating layer and the seat support. Thus, the comfort level and the quality of the product is greatly enhanced.

BRIEF DESCRIPTION OF THE DRAWINGS

To clearly expound the present invention or technical solution, the drawings and embodiments are hereinafter combined to illustrate the present invention. Obviously, the drawings are merely some embodiments of the present invention and those skilled in the art can associate themselves with other drawings without paying creative labor.

Marking Instructions of the Drawings.

Surface Coating Layer 1, The First Hook-shaped Structure 11, The First Turning Portion 12, The First Beam 13, Seat Support 2, The Second Hook-shaped Structure 21, The Second Beam 22, Mold 3.

DETAILED DESCRIPTION OF THE INVENTION

Drawings and detailed embodiments are combined hereinafter to elaborate the technical principles of the present invention.

As shown in FIGS. 1-4, the compound type polyurethane toilet seat comprises a surface coating layer 1, a positioning structure and a seat support 2. The surface coating layer 1, which is made from polyurethane, seamlessly covers the outer surface of the seat support 2 through the positioning structure.

Figure 1:
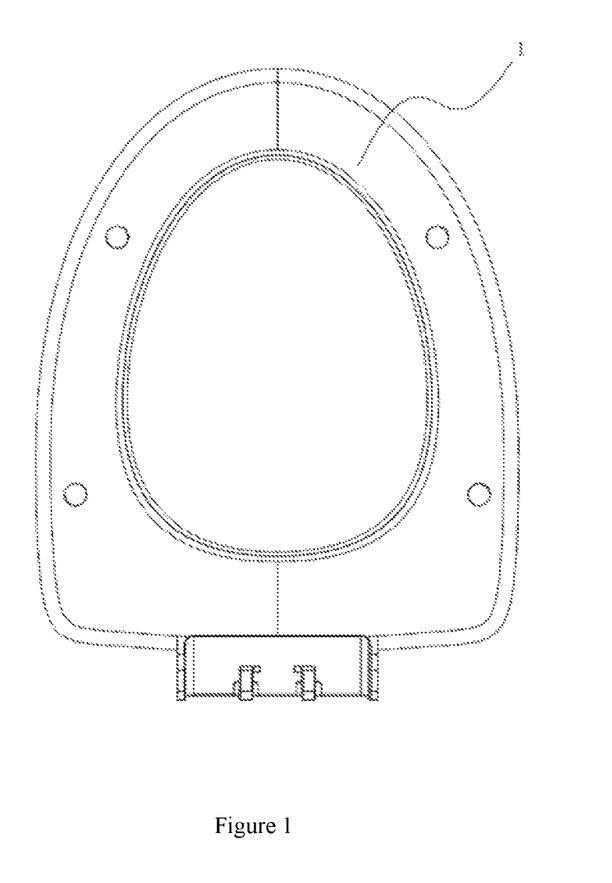
FIG. 1 is an upward view of the present invention.
Figure 2:
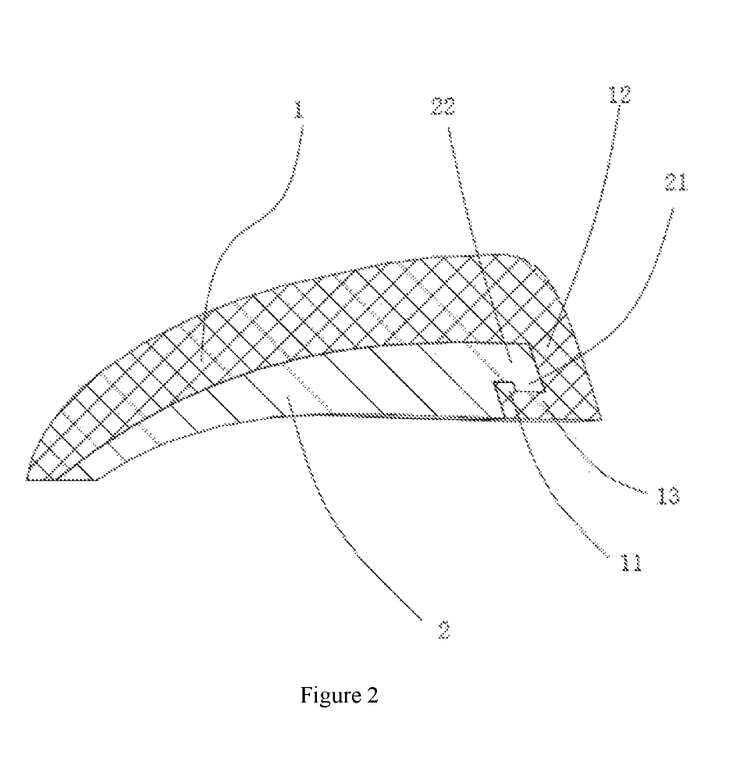
FIG. 2 is a structure diagram of the surface coating layer and the seat support of the present invention.

There are various types of the positioning structure. Specifically, the positioning structure comprises a first turning portion 12 and a first beam 13, which are integrally disposed at the end portion of the surface coating layer 1. The first turning portion 12 is connected to the first beam 13, and the first beam 13 extends upward to form a first hook-shaped structure 11. A second beam 22 is integrally disposed at the upper side of the end portion of the toilet seat 2, and the second beam 22 extends downward to form a second hook-shaped structure 21. The first hook-shaped structure 11 is engaged with the second hook-shaped structure 21.

In this embodiment, seat support 2 can be composed of various materials, including plastics, wood, or metal. The plastic material is preferred to be PP (polypropylene), soft PVC (polyvinyl chloride), ABS (acrylonitrile-butadiene-styrene copolymer), or urea formaldehyde, wherein PP (polypropylene) has good surface rigidity and scratch resistance, effectively avoiding the environmental stress cracking; soft PVC has high mechanical performance, tensile strength, impact strength, and dielectric performance; ABS is a thermoplastics type high polymer material having high intensity and tenacity, which can be easily processed; consequently, the product made from ABS can be easily dyed and electroplated; urea formaldehyde is cheap, has a light color, high hardness, is oil resistant, mildew resistance, temperature resistance and good insulation, which is eco-friendly, non-toxic and tasteless.

Figure 3:
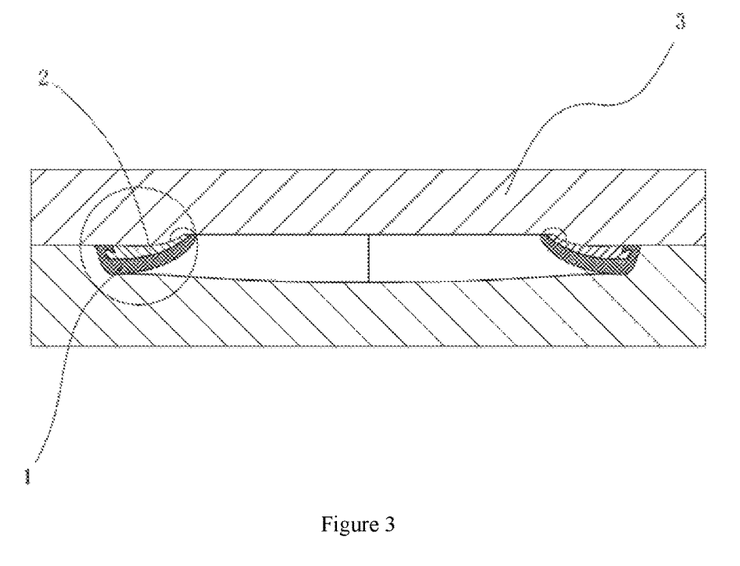
FIG. 3 is a structure diagram when the present invention is placed in the mold.
Figure 4:
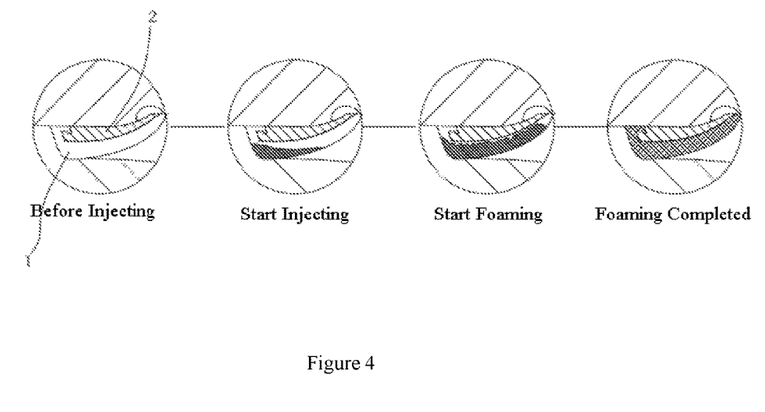
FIG. 4 is a schematic diagram of the polyurethane foaming process of the present invention.

The preparation process of the compound type polyurethane toilet seat, comprising:

Step 1: spraying a release agent and an in-mold paint in a cavity of a mold 3;

Step 2: cleaning the surface of the seat support 2 by industrial alcohol;

Step 3: polishing or abrasive blasting the seat support 2; afterwards, blowing the dust off the surface of the seat support 2;

Step 4: thermally treating the cleaned seat support 2 within a temperature of 50-120° C.; the thermal treatment time is 30-120 minutes;

Step 5: spraying the release agent in the cavity of the mold 3, and installing the seat support 2 in the cavity of the mold 3; the temperature of the mold is controlled within the range of 20-60° C.;

Step 6: injecting a polyurethane raw material into the cavity of the mold 3, and shaking the mold 3; the polyurethane raw material injected can uniformly flow within the cavity of the mold 3 through shaking the mold 3, ensuring a uniform density of each part of the product and preventing the production of bubbles.

Step 7: foaming the polyurethane raw material in the cavity of the mold 3, and making the polyurethane to seamlessly cover the outer surface of the seat support 2;

Step 8: opening the mold to take out the product after the polyurethane is cured in the mold 3, thereby completing the whole preparation process of the product; the curing time is less than 25 minutes.

The polyurethane material of the present invention is foamed in the mold 3 and covers the outer surface of the seat support 2, allowing the surface coating layer 1 and the seat support 2 to be simultaneously processed. Consequently, the bonding step of the surface coating layer 1 and the seat support 2 can be saved. Namely, the compound type polyurethane toilet seat can be manufactured by the one-time molding process, which eliminates the delamination phenomenon of the surface coating layer 1 and the seat support 2, and improves the bonding intensity between the surface coating layer 1 and the seat support 2. The performance of the product manufactured according to the present invention is far better than the traditional manufacturing process.

To achieve a better performance of the surface coating layer 1, the polyurethane raw material comprises a component A (polyether polyol and accessory material) and a component B (isocyanate), wherein the mass ratio of the component B to the component A is 0.2-0.6. The component A reacts with the component B within a range of 20-40° C. The component A comprises the following raw materials in parts by weight: 100 parts of polyether polyol, 2 to 10 parts of chain extender, 0.3 to 3 parts of catalyst, 0.5 to 3 parts of surfactant, and 2 to 30 parts of foaming agent. The isocyanate is single-component isocyanate or multi-component isocyanate. The component A and the component B react within a temperature of 20-40° C. to produce the polyurethane. The performance index of the surface coating layer made from the polyurethane is the following:

TABLE 1

The Performance Index of the Surface Coating Layer

| Items | Units | Performance Index |
|---|---|---|
| Hardness | HSA | 15-70 |
| Density | Kg/m$^3$ | 100-800 |
| Tensile Strength | Mpa | ≥0.40 |
| Breaking Elongation | % | ≥50 |
| Tearing Strength | N/mm | ≥0.30 |

Embodiment 1

The component A and the component B react at the temperature of 30° C. to produce the polyurethane of this embodiment. The component A comprises the following raw materials in parts by weight: 100 parts of polyether polyol in which the polyether polyol (Mn=5000) is 70 parts and the polypolyols is 30 parts, 5 parts of chain extender in which the glycol is 3.5 parts and the 1,4-butanediol is 2 parts, 1.2 parts of catalyst (1.2 parts of amine catalyst), 0.75 parts of surfactant (0.75 parts of silanes surfactant), and 15 parts of foaming agent (15 parts of HCFC-141b); the component B is isocyanate, wherein the mass ratio of the component B to the component A is 0.35.

The preparation process of the compound type polyurethane toilet seat, comprising:

Step 1: spraying a release agent and an in-mold paint in a cavity of a mold 3;

Step 2: cleaning the surface of the seat support 2 by industrial alcohol;

Step 3: polishing or abrasive blasting the seat support 2; afterwards, blowing the dust off the surface of the seat support 2;

Step 4: thermally treating the cleaned seat support 2 under the temperature of 60° C.; the thermal treatment time is 120 minutes;

Step 5: spraying the release agent in the cavity of the mold 3, and installing the seat support 2 in the cavity of the mold 3; the temperature of the mold is controlled at 40° C.;

Step 6: injecting a polyurethane raw material into the cavity of the mold 3, and shaking the mold 3; the polyurethane raw material injected can uniformly flow in the cavity of the mold 3 through shaking the mold 3, ensuring a uniform density of each part of the product and preventing the production of bubbles.

Step 7: foaming the polyurethane raw material in the cavity of the mold 3, and making the polyurethane to seamlessly cover the outer surface of the seat support 2;

Step 8: opening the mold to take out the product after the polyurethane is cured in the mold 3, thereby completing the whole preparation process of the product; the curing time is 6 minutes.

TABLE 2

The Performance Index of the Surface Coating Layer

| Items | Units | Performance Index |
|---|---|---|
| Hardness | has | 30 |
| Density | Kg/m$^3$ | 350 |
| Tensile Strength | Mpa | 0.6 |
| Breaking Elongation | % | 80 |
| Tearing Strength | N/mm | 0.7 |

Embodiment 2

The component A and the component B react under the temperature of 40° C. and produce the polyurethane of this embodiment. The component A comprises the following raw materials in parts by weight: 100 parts of polyether polyol in which the polyether polyol (Mn=5000) is 80 parts and the polypolyols is 20 parts, 3 parts of glycol, 2 parts of 1,4-butanediol, 2 parts of amine catalyst, 0.5 parts of surfactant, and 20 parts of foaming agent; the component B is isocyanate, wherein the mass ratio of the component B to the component A is 0.25.

The preparation process of the compound type polyurethane toilet seat, comprising:

Step 1: spraying a release agent and an in-mold paint in a cavity of a mold 3;

Step 2: cleaning the surface of the seat support 2 by industrial alcohol;

Step 3: polishing or abrasive blasting the seat support 2; afterwards, blowing the dust off the surface of the seat support 2;

Step 4: thermally treating the cleaned seat support 2 under the temperature of 115° C.; the thermal treatment time is 30 minutes;

Step 5: spraying the release agent in the cavity of the mold 3, and installing the seat support 2 in the cavity of the mold 3; the temperature of the mold is controlled at 55° C.;

Step 6: injecting a polyurethane raw material into the cavity of the mold 3, and shaking the mold 3; the polyurethane raw material injected can uniformly flow in the cavity of the mold 3 through shaking the mold 3, ensuring a uniform density of each part of the product and preventing the production of bubbles;

Step 7: foaming the polyurethane raw material in the cavity of the mold 3, and making the polyurethane to seamlessly cover the outer surface of the seat support 2;

Step 8: opening the mold to take out the product after the polyurethane is cured in the mold 3, thereby completing the whole preparation process of the product; the curing time is 4 minutes.

TABLE 3

The Performance Index of the Surface Coating Layer

| Items | Units | Performance Index |
|---|---|---|
| Hardness | HSA | 20 |
| Density | Kg/m$^3$ | 200 |
| Tensile Strength | Mpa | 0.50 |
| Breaking Elongation | % | 60 |
| Tearing Strength | N/mm | 0.40 |

Embodiment 3

The component A and the component B react under the temperature of 20° C. and produce the polyurethane of this embodiment. The component A comprises the following raw materials in parts by weight: 100 parts of polyether polyol, 3.5 parts of glycol, 1.5 parts of 1,4-butanediol, 0.8 parts of amine catalyst, 0.75 parts of silanes surfactant, and 12 parts of HCFC-141b; the component B is isocyanate, wherein the mass ratio of the component B to the component A is 0.55.

The preparation process of the compound type polyurethane toilet seat, comprising:

Step 1: spraying a release agent and an in-mold paint in a cavity of a mold 3;

Step 2: cleaning the surface of the seat support 2 by industrial alcohol;

Step 3: polishing or abrasive blasting the seat support 2; afterwards, blowing the dust off the surface of the seat support 2;

Step 4: thermally treating the cleaned seat support 2 under the temperature of 85° C.; the thermal treatment time is 120 minutes;

Step 5: spraying the release agent in the cavity of the mold 3, and installing the seat support 2 in the cavity of the mold 3; the temperature of the mold is controlled at 25° C.;

Step 6: injecting a polyurethane raw material into the cavity of the mold 3, and shaking the mold 3; the polyurethane raw material injected can uniformly flow in the cavity of the mold 3 through shaking the mold 3, ensuring a uniform density of each part of the product and preventing the production of bubbles;

Step 7: foaming the polyurethane raw material in the cavity of the mold 3, and making the polyurethane to seamlessly cover the outer surface of the seat support 2;

Step 8: opening the mold to take out the product after the polyurethane is cured in the mold 3, thereby completing the whole preparation process of the product; the curing time is 20 minutes.

TABLE 4

The Performance Index of the Surface Coating Layer

| Items | Units | Performance Index |
| --- | --- | --- |
| Hardness | HSA | 60 |
| Density | Kg/m³ | 500 |
| Tensile Strength | Mpa | 0.8 |
| Breaking Elongation | % | 85 |
| Tearing Strength | N/mm | 1.0 |

The present invention has the following advantages:

First, compared with the traditional embedded type polyurethane toilet seat, the outer surface of the seat support is seamlessly covered by the surface coating layer of the present invention, which can provide the user a higher comfort level as well as decrease the use of polyurethane raw material. Consequently, the manufacturing cost can be effectively reduced and the marketing value of the product can be greatly improved.

Second, compared with the traditional compound type polyurethane toilet seat, the present invention adopts the one-time molding process, effectively simplifying the complicated steps so as to achieve a simpler and quick manufacturing process.

Third, the one-time molding process of the present invention enables the surface coating layer to seamlessly cover the seat support through the positioning structure, effectively eliminating the delamination phenomenon of the surface coating layer and the seat support. Furthermore, the present invention prevents the surface coating layer from being separated from the seat support due to the frequent use in the cold or hot weather, greatly improving the bonding intensity between the surface coating layer and the seat support. Thus, the comfort level and the quality of the product can be effectively enhanced.

The description of above embodiments allows those skilled in the art to realize or use the present invention. Without departing from the spirit and essence of the present invention, those skilled in the art can combine, change or modify correspondingly according to the present invention. Therefore, the protective range of the present invention should not be limited to the embodiments above but conform to the widest protective range which is consistent with the principles and innovative characteristics of the present invention. Although some special terms are used in the description of the present invention, the scope of the invention should not necessarily be limited by this description. The scope of the present invention is defined by the claims.

The invention claimed is:

1. A method for preparing a compound type polyurethane toilet seat, the method comprising:
    Step 1: spraying a release agent and an in-mold paint in a cavity of a mold;
    Step 2: cleaning the surface of the seat support by industrial alcohol;
    Step 3: polishing or abrasive blasting the seat support; afterwards, blowing the dust off the surface of the seat support;
    Step 4: thermally treating the cleaned seat support a temperature within 50-120° C.; the thermal treatment time is 30-120 minutes;
    Step 5: spraying the release agent in the cavity of the mold, and installing the seat support in the cavity of the mold; the temperature of the mold is controlled within the range of 20-60° C.;
    Step 6: injecting a polyurethane raw material into the cavity of the mold, and shaking the mold;
    Step 7: foaming the polyurethane raw material in the cavity of the mold, and making the polyurethane to seamlessly cover the outer surface of the seat support;
    Step 8: opening the mold to take out the product after the polyurethane is cured in the mold, thereby completing the whole preparation process of the product; the curing time is less than 25 minutes;
    wherein the compound type polyurethane toilet seat comprises a positioning structure, a seat support, and a surface coating layer made from polyurethane that seamlessly covers the outer surface of the seat support through the positioning structure.

2. The method of claim 1, wherein the cleaned seat support is thermally treated at a temperature of 60° C. in step 4.

3. The method of claim 1, wherein the temperature of the mold is controlled at 50° C. in step 5.

4. The method of claim 1, wherein the curing time of the polyurethane is 6 minutes in step 8.

5. The method claim 1, wherein the polyurethane raw material comprises a component A comprising a polyether polyol.

6. The method of claim 5, wherein the component A comprises the following raw materials in parts by weight: 100 parts of polyether polyol, 2 to 10 parts of chain extender, 0.3 to 3 parts of catalyst, 0.5 to 3 parts of surfactant, and 2 to 30 parts of foaming agent.

7. The method of claim 5, wherein said component A further comprises an accessory material.

8. The method of claim 1, wherein the polyurethane raw material comprises a component B comprising isocyanate.

9. The method of claim 8, wherein the isocyanate is a single-component isocyanate or multi-component isocyanate.

10. The method of claim 1, wherein the polyurethane raw material comprises a component A comprising a polyether polyol and an accessory material, and a component B comprising isocyanate, wherein the mass ratio of the component B to the component A is 0.2-0.6.

11. The method of claim 10, wherein the component A reacts with the component B at temperatures from 20-40° C.

12. The method of claim 1, wherein the positioning structure of the toilet seat comprises a first turning portion and a first beam.

13. The method of claim 12, wherein the first turning portion and first beam are integrally disposed at the end portion of the surface coating layer.

14. The method of claim 13, wherein the first turning portion is connected to the first beam, and the first beam extends upward to form a first hook-shaped structure.

15. The method of claim 14, wherein a second beam is integrally disposed at the upper side of the end portion of the toilet seat.

16. The method of claim 15, wherein the second beam extends downward to form a second hook-shaped structure.

17. The method of claim 16, wherein the first hook-shaped structure is engaged with the second hook-shaped structure.

* * * * *